Patented Mar. 16, 1926.

1,577,411

UNITED STATES PATENT OFFICE.

KARL B. THEWS, OF DENVER, COLORADO, ASSIGNOR TO WILLIAM A. J. BELL, OF DENVER, COLORADO.

ART OF RECOVERING RARE METALS FROM THEIR ORES.

No Drawing. Application filed July 12, 1921. Serial No. 484,198.

*To all whom it may concern:*

Be it known that I, KARL B. THEWS, a German citizen, and resident of Denver, in the county of Denver and State of Colorado, have invented certain new and useful Improvements in the Art of Recovering Rare Metals from Their Ores, of which the following is a specification.

This invention relates to the art of recovering such rare metals as vanadium, uranium and radium from the ores containing any or all of these metals and is intended to effect large economies in time and expense in accomplishing such result.

In my application for U. S. Letters Patent No. 468359 I have indicated the difficulties surrounding the recovery of the metallic values from such ores as carnotite or similar vanadium or uranium radium bearing ores, and have indicated that a great saving in time and expense for chemicals may be effected by the use of a reagent or reagents that are capable of effecting a reducing action as well as dissolving the sought for values. In that application the reducing agent mentioned belonged to the class of organic acids and was used in treating the body of ore after it had been ground to convenient fineness and had been diluted with a body of water to give it the necessary fluidity.

The present invention is still founded upon the use of a reducing agent as an aid to effecting a solution of the values contained in the ore, but in this case the reducing process is of a somewhat different character since it takes the form of a reducing roasting process rather than merely a mingling of the reducing reagent with the comminuted and diluted ore body in the acid bath.

In another pending application filed simultaneously herewith I have pointed out how the range of materials available as reducing reagents for the purpose of treating the ore bath and effecting the solution of the sought for values may be widely extended by the use of reducing reagents that are not necessarily acid solvents, the acid solvent being furnished as an added ingredient.

While the present process may make use of many substances in the classes of reducing agents referred to in said last-mentioned application, nevertheless, the present process differs from the process set forth in said application in that it involves a distinct roasting with reducing agents for the purpose of effecting reduction which, therefore, is carried on not only at higher temperatures than would be used in my other processes above referred to but also without the dilution of the ore with a large body of water in the first instance when effecting the reducing action.

It is to be observed that experiments have been tried heretofore in this art in the attempt to utilize a roasting process but in that case the roasting operation employed was not a reducing roast at all but generally involved the roasting of the ore mixed with salt which resulted in converting a part only of the vanadium content to sodium vanadate which is water-soluble and which was then leached out with water and separated from the gangue by filtration. It then was necessary to resort to expensive operation in the treatment of the tailings to recover the uranium and the residue of the vanadium, and still other processing was resorted to for the recovery of the radium content. It will therefore be seen that prior roasting processes used for the purpose of aiding in the recovery of the values of carnotite or other vanadium bearing or uranium bearing ores consisting chiefly of silicious matter were both complex and expensive.

I will now describe the principles characterizing the present improvement which, essentially speaking, consists in subjecting the carnotite ore body to a reducing roast with carbonaceous material or hydrogen or the like for a sufficient period to effect the reduction of the ore and thereafter subjecting the ore body when diluted to treatment with the necessary quantity of an acid solvent to put the contained values into solution from which each may be recovered by any suitable or well-known process.

A great variety of reducing agents are available for use in this roasting process and include gases, liquids and solid reducing agents. Among the gaseous reducing agents that are available for use there may be mentioned such gases as hydrogen, methane coal gas, vaporized oils and carbon-monoxide as examples of gases of the hydrocarbon materials that are easily procurable for such reduction.

When using gaseous reducing agents I use a closed rotatable furnace having a suitable gas inlet and outlet with heat applied externally.

The ore to be treated is preferably ground to a fineness of from 20 to 40 mesh and is then introduced into the reducing retort or furnace and the hydrogen or other reducing gas is then introduced say at one end of the furnace so as to be thoroughly mingled with the agitated body of ore, a vent being provided at the other end for the escape of gases. The temperature maintained here should be in the neighborhood of 1200° to 1400° F. although no exact or precise degree of temperature need be specified. The reducing process is continued until the particular ore body has been sufficiently reduced. Generally, under most conditions, a roasting period of from an hour to an hour and a half will amply suffice to effect complete reduction.

In view of the tendency of the oxygen of the air to oxidize the ore, I deem it advisable to continue the inflow of the hydrogen or other reducing gas until the ore body has pretty well cooled off, thereby preventing any tendency of the air to undo or neutralize the reducing operation which might take place if the supply of reducing agent were shut off while the body of ore is still very hot.

Among the solid substances that may be used as reducing reagents and that are easily available for such purpose I may mention powdered charcoal, coal, coke and sugar as illustrative of materials in which, the carbon is the reducing agent.

Owing to the tendency of the charcoal or sugar, because of its relative lightness as compared with the ore, to come to the top it may be found desirable to use a binder such as colophony or pitch which is mixed with the ground up carbon to prevent this tendency to separate from the body of the ore. Of course, there are many liquids that are known to be capable of reducing action and hence liquids also are available for this roasting process such, for example, as crude oil, the alcohols, etc. In short, the range of materials available for this reducing operation is so wide that in practically every locality where these rare ores are found several such materials could be readily obtained for the purpose of carrying on the roasting operation, and this is obviously a great desideratum in the practice of an economical process.

After having been put through the reducing operation by roasting, the comminuted ore body is then diluted with a sufficient volume of water to give it a convenient degree of fluidity, say water to the amount of two or three times the weight of the ore and the diluted ore body is then treated with any suitable acid solvent say, for example, hydrochloric acid which is cheap and readily obtained although, of course, other suitable acid solvents may be used. The amount of acid for an average carnotite ore would be equal to a slight excess over the neutralizing value of the ore. The bath containing the diluted ore and acid solvent would then preferably be agitated and heated to hasten the dissolving process.

As is well understood the hydrochloric acid converts the metallic values into vanadium uranium radium chlorides which are present in solution in the liquid which is then decanted or otherwise mechanically separated from the gangue and the liquor will be found to contain substantially all of the sought for values, the tailings containing a merely negligible percentage of such values if any, and therefore being discarded. The liquid solution containing the values may then be treated by any approved or suitable process as will be understood by those skilled in the art for the purpose of recovering the separate values therefrom.

The cooling of the hot roasted ore body after its reduction may be economically effected by discharging or conveying the hot body of reduced ore directly into the vat or tank in which the ore body is to be diluted and treated with the acid solvent instead of being separately cooled before the ore is subjected to the action of the solvent reagent. Indeed if the ore body, while still hot, is introduced directly into the acidulated bath or into the water bath and the acid solvent be thereafter added it will be plain that a very considerable economy of fuel may be effected since there would be sufficient heat present in the ore body so discharged from the furnace to raise the temperature of the bath to the boiling point and thereby economize in the use of a separate fuel supply for heating the ore bath.

What I claim is:

1. The improvement in the art of recovering vanadium, uranium and radium from carnotite ore which consists in first subjecting the containing ore body in the presence of a reducing agent to a reducing heat applied from an external source and thereafter subjecting the ore so roasted to the action of an acid solvent and thus putting the contained values sought for into solution preparatory to the further recovery of such values, substantially as described.

2. The improvement in the art of recovering vanadium, uranium radium from carnotite ore which consists in roasting by means of externally applied heat a comminuted body of ore in the presence of a reducing agent to effect the reduction of the ore, and thereafter diluting said roasted ore to render it fluid, and putting the values into solution by the application of a relatively small quantity of an acid solvent, substantially as described.

3. The improvement in the art of recovering the rare metal values from carnotite ores which consists in roasting said ore in a comminuted state at a reducing temperature while mingling a reducing agent therewith, and then subjecting said ore in its reduced condition to the action of an acid solvent and thereby putting substantially the entire values of said ore into solution preparatory to separate recovery thereof, substantially as described.

4. The improvement in the art of recovering the rare metal values from carnotite ores which consists first in subjecting a comminuted body of the ore to the action of a reducing agent at an ore reducing temperature until the ore is brought to the desired state of reduction, allowing the ore so reduced to cool much below the reducing temperature while still in the presence of a reducing agent, and thereafter diluting said ore body and treating it with a solvent for the purpose of extracting its values, substantially as described.

5. The improvement in the art of recovering the rare metal values from a carnotite ore which consists in first subjecting said ore to the action of a reducing agent by externally applied heat and thereafter treating the ore so reduced with an acid solvent and thereby putting the contained values into solution preparatory to the recovery of such values, substantially as described.

6. The improvement in the art of recovering the values from carnotite ores which consists in heating the ore body to a reducing temperature in the presence of a reducing reagent, and then conveying the reduced ore while still hot into a bath and putting the values of the ore in said bath into solution by means of a relatively small quantity of an acid solvent, substantially as described.

In witness whereof, I have subscribed the above specification.

KARL B. THEWS.